United States Patent [19]
Lorenzini et al.

[11] 3,724,162
[45] Apr. 3, 1973

[54] MISALIGNED END CAP DETECTING MECHANISM FOR A CAPPING DEVICE

[75] Inventors: Raymond Lorenzini; Richard I. Kinsella, both of Rochester, N.Y.

[73] Assignee: Eastman Kodak Company, Rochester, N.Y.

[22] Filed: Nov. 23, 1971

[21] Appl. No.: 201,509

[52] U.S. Cl. ..........................53/78, 53/77, 53/330
[51] Int. Cl. ..............................................B65b 57/18
[58] Field of Search..............................53/78, 77, 330

[56] References Cited

UNITED STATES PATENTS

| 1,805,680 | 5/1931 | Youngdahl | 53/78 X |
| 3,228,169 | 1/1966 | Brown | 53/78 |

Primary Examiner—Travis S. McGehee
Attorney—William T. French et al.

[57] ABSTRACT

A detecting mechanism in a capping device of a spooling machine for detecting an improperly capped magazine by sensing a predetermined level of interference between a magazine and an end cap during the capping operation, and in response thereto actuating a control circuit for controlling several operations such as, among other things, inhibiting the operation of a staking mechanism, stopping the spooling machine including the capping device after it has completed a cycle of operation, opening a reject chute to receive the improperly capped magazine, and alerting the operator by actuating a signal device. Any interference between the end cap and magazine equal to or in excess of the predetermined level causes relative movement between the staking mechanism and a staking head which moves the staking mechanism to its staking position. Such relative movement causes leakage in a positive or negative fluid pressure system of the detecting mechanism resulting in a change in pressure which is sensed by a fluidic sensor of the detecting mechanism. The sensor is interrogated by an interrogating input in the form of a voltage pulse, and the interrogating pulse in combination with a change in pressure actuates a flip-flop circuit to initiate the aforementioned operations.

7 Claims, 6 Drawing Figures

PATENTED APR 3 1973 3,724,162

RAYMOND LORENZINI
RICHARD I. KINSELLA
INVENTORS

BY
Steve W. Grenban
ATTORNEY

MISALIGNED END CAP DETECTING MECHANISM FOR A CAPPING DEVICE

BACKGROUND OF THE INVENTION

1. Field of the Invention

This invention relates generally to detectors, and more specifically to a detecting mechanism for a magazine capping device for detecting interference between a magazine and an end cap during the capping operation, indicating an improperly aligned cap.

2. Description of the Prior Art

It is known in the photographic industry to provide cylindrical film cans or magazines having a light-tight cap at one end and a light-tight magazine mouth formed by axially extending, peripheral spaced apart lips to which plush material is secured in facing relation. In the manufacture of film magazines under dark room conditions, a roll of unexposed light-sensitive film is fed into the outer free end of such a magazine with a leading end thereof extending through the light-tight mouth of the magazine. The magazine containing the film is positioned in a forming or capping jaw which compresses the outer free end of the magazine to the precise shape for receiving an end cap. An end cap is fed from an end cap source to a position in alignment with the magazine, and the end cap advanced by a staking mechanism onto or over the free end of the magazine. A portion of the staking mechanism is expanded crimping the rim of the end cap to the end of the magazine to form a light-tight film magazine. Problems have arisen in situations in which the magazine and/or end cap are improperly positioned, bent or tilted, and for this or any other reason the cap is improperly staked onto the magazine. When this occurs, interference results between the end cap and magazine during the cap staking operation. Improperly staked caps normally result in a magazine light-leak and subsequent fogging of the film when the defective magazine is brought out of the dark room into light. Unfortunately, improperly staked magazines are often not readily discovered, and when sold to customers are used resulting in spoiled photographs of scenes that sometimes cannot readily be retaken. This problem of the sale to customers of defective magazines due to improperly staked end caps, and subsequent spoiled photographs, is solved in this invention by a detecting mechanism for detecting a predetermined level of interference between the end cap and magazine during the capping operation, and in response thereto initiating one or more of the following operations, namely inhibiting the staking operation, stopping the spooling machine including the capping device after it has completed a cycle of operation, discharging the improperly capped magazine into a reject bin, and alerting the operator.

SUMMARY OF THE INVENTION

This invention includes within its scope a detecting mechanism for detecting interference above a predetermined level between an end cap and a magazine during a capping operation indicating a defective capped magazine. In response to the detection of such interference, suitable means are actuated for inhibiting the staking operation, stopping the spooling machine including the capping device after it has completed a cycle of operation, rejecting the improperly capped magazine, and alerting the operator. In a preferred embodiment of the detecting mechanism, staking fingers of an axially movable staking mechanism engage an end cap and mount it onto the end of the magazine which extends into a cylindrical anvil. After the end cap is mounted, a staking power means is operated for expanding the staking fingers and causing them to press or crimp the inner rim of the end cap to the end of the magazine. The staking fingers are mounted for axial movement relative to a supporting staking head, and portions of the fingers and head are biased by a spring to a normal position into engagement with one another for holding the fingers and head together as a unit. However, in the event interference in excess of the spring force should occur between the end cap and the magazine during movement of the staking head to its staking position, such interference will stop further advance of the staking fingers while the remainder of the staking head continues its motion towards the staking position against the bias of the spring. Any such relative movement between the staking fingers and head causes an annular ring interposed between the staking fingers and spring to move from its normal closed position preventing fluid leakage in a positive or negative fluid pressure system to an open position in which fluid leakage and a change in pressure occurs. Such fluid leakage causes a change in pressure in the pressure system which is sensed by any suitable fluidic sensor, and in response thereto generates a control signal, which in combination with an interrogating pulse from a logic control system, actuates a flip-flop bistable circuit or the like for, among other things, inhibiting the staking operation, stopping the spooling machine including the capping device after it has completed a cycle of operation, discharging the improperly capped magazine into a reject bin, and alerting the operator.

Accordingly, one of the objects of the present invention is to provide a detecting mechanism in a capping device for detecting interference above a predetermined level between a magazine and an end cap mounted on the magazine during a capping operation, and in response to such detection, inhibiting staking of the mounted cap to the magazine during the capping operation.

Another object of the invention is to provide an improved capping device for film magazines that eliminates the production of defective film magazines suffering from light-leak due to improperly staked end caps.

Another object of the invention is to provide an improved capping device for film magazines that eliminates the production of defective film magazines in which the photosensitive film contained therein is exposed or fogged when the film magazine is brought out of the dark room into daylight.

Another object of the invention is to provide an improved capping device for film magazines having means for detecting interference above a predetermined value between a magazine and an end cap as it is mounted thereon, and in response to such detection to, among other things, inhibit staking of the mounted cap to the magazine, to stop the spooling machine including the capping device after it has completed a cycle of operation, to discharge the improperly capped magazine into a reject bin, and to alert the operator.

Another object of the invention is to provide a detecting system in a film magazine capping device that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
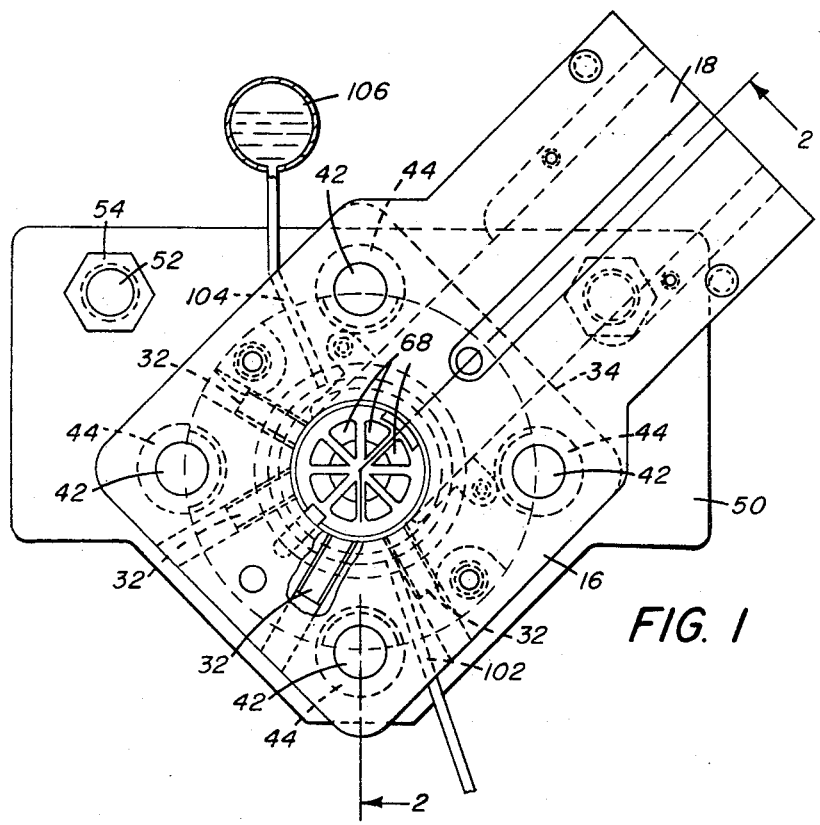
FIG. 1 is a front elevational view of a film magazine capping device in which a preferred embodiment of the misaligned end cap detecting mechanism of this invention is incorporated.
Figure 2:
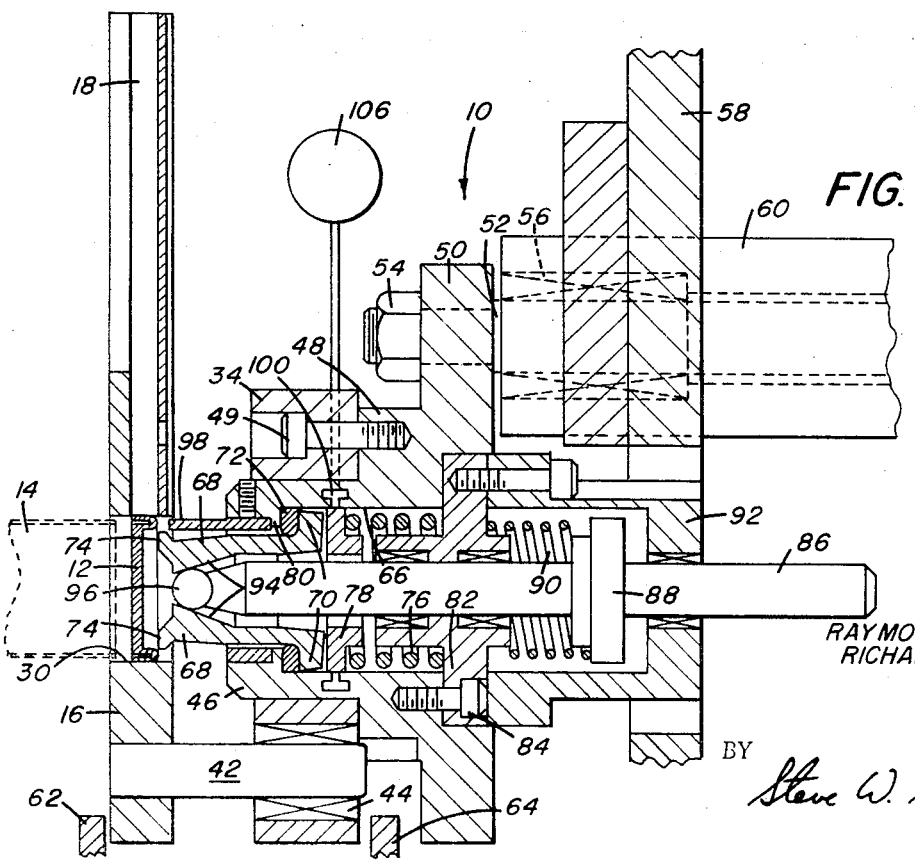
FIG. 2 is a sectional view taken along line 2—2 of FIG. 1.
Figure 3:
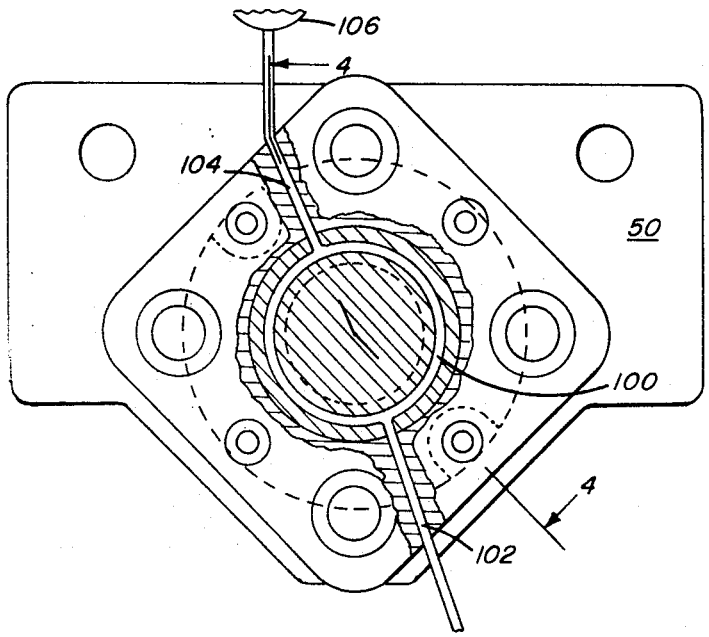
FIG. 3 is a front elevational view with parts broken away of the capping device of FIG. 1 with the face plate and staking fingers omitted for purposes of clarity.
Figure 4:
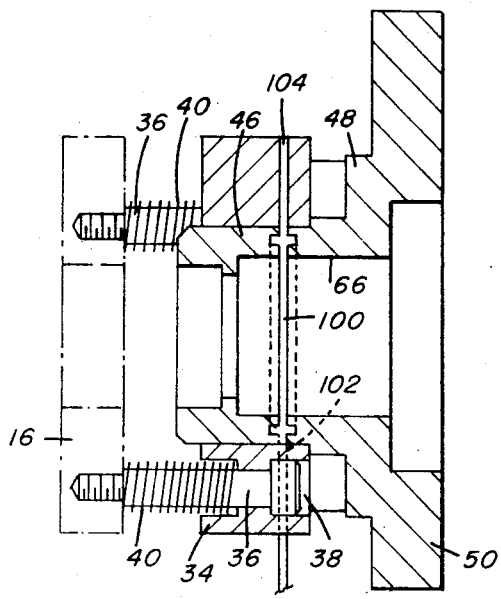
FIG. 4 is a section view taken along line 4—4 of FIG. 3.
Figure 5:
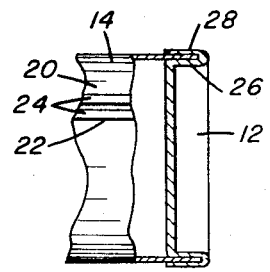
FIG. 5 is an enlarged segmental view in section of a film magazine showing an end cap secured thereto.

With reference to the drawings, a preferred embodiment of the misaligned end cap detecting mechanism of this invention is illustrated in connection with a capping device 10 for mounting an end cap 12 (FIG. 5) onto a film magazine 14 and staking it thereto in light-tight relation. The capping device 10 is of a type generally known in the art comprising a staking head having a face plate 16, and a magazine end cap feed chute 18 secured to the face plate into which end caps 12 are fed one at a time by any suitable means, not shown, in proper orientation for mounting onto the end of magazine 14. The magazine, as best seen in part in FIGS. 2 and 5, is generally circular and has spaced apart lips 20, 22 to which plush material 24 is secured to form a light-tight mouth. The circular end cap 12 to be mounted onto one end of magazine 14 has a peripheral rim formed by inner and outer walls 26, 28 respectively defining an annular groove therebetween for receiving the end of the magazine. The end caps 12 are gravity fed one by one down feed chute 18 to a nesting position in alignment with a circular opening 30 in face plate 16. The cylindrical wall of the face plate opening 30 serves as an anvil for outer wall 28 of the end cap which is held precisely in the nesting position in opening 30 by a plurality of magnets 32 in face plate 16 surrounding a portion of the periphery of end cap 12. The magazine 14 containing film but absent an end cap 12 is fed by a forming or capping jaw mechanism, not shown, to the dotted position illustrated in FIG. 2 in precise alignment with opening 30. The forming mechanism forms the free end of magazine 14 so that an end cap can be placed thereon in position to be staked thereto. The face plate 16 is secured to an annular bushing plate 34 of the staking head by a pair of bolts 36 as best seen in FIGS. 3 and 4 for relative movement therebetween. Each bolt 36 has one end threaded into face plate 16 and the head thereof at the opposite end movable within bores 38 in bushing plate 34. A helical spring 40 encircles each bolt and is interposed between the face and bushing plates 16, 34 respectively for urging them to a normal expanded position as seen in FIG. 4 in which the head engages the bottom of bore 38. The face plate 16 is further provided with four guide rods 42 slidably movable within bushings 44 carried by bushing plate 34. The bushing plate has a central opening for receiving the nose 46 of an annular housing 48 and is secured to the housing by screws 49 (FIGS. 1 and 2). The housing 48 has a flange 50 as best seen in FIGS. 1 and 2 to which a pair of guide posts 52 are secured by nuts 54. The housing 48, bushing plate 34 and face plate 16 of the staking head are guided as a unit for reciprocal movement by support bushings 56 in fixed frame members 58, 60 through which guide posts 52 are journaled. Reciprocal movement is imparted to the staking head between a normal retracted position as seen in FIG. 2 and a staking position in which face plate 16 engages a stop 62 and housing 48 and bushing plate 34 are moved relative to face plate 16 to another stop 64 interposed between plate 34 and housing 48 for moving an end cap onto a magazine by means to be explained hereinafter. Such reciprocal movement of the staking head is accomplished by any known fluid cylinder means including a piston rod coupled by any suitable means to posts 52. The housing 48 further has a central circular opening 66 (FIG. 4) for housing certain elements of a cap staking mechanism. The cap staking mechanism as best seen in FIG. 2 comprises a plurality of staking levers 68 of pie shaped cross section arranged in a circle, and having hook shaped ends 70 pivotally mounted on the rounded inner periphery of a ring 72. The opposite ends of levers 68 are provided with shoes 74 for engaging the end surface of a cap 12 adjacent its inner wall 26 and moving the cap onto a magazine 14 when the staking head is moved to the staking position. The hook shaped ends 70 are urged by a helical spring 76 and slidably mounted annular spring retainer 78 of L-shaped cross section into engagement with ring 72 which bears against an inner peripheral rim 80 within the opening. The spring 76 is interposed between retainer 78 and a support plate 82 secured to housing 48 by screws 84 (FIG. 2). The plate 82 has bushings for slidably supporting an expander shaft 86 of the staking mechanism having a collar 88 and a helical spring 90 interposed between plate 82 and collar 88 for urging shaft 86 in a normal retracted position against any suitable stop, not shown. A cup-shaped end cap 92 (FIG. 2) is secured to plate 82 by screws for enclosing spring 90, and further has a bushing through which shaft 86 is journaled. The staking levers 68 are provided with inner ramps 94 which cooperate to form a frusto-conically shaped cavity into which a steel ball 96 is placed adjacent the end of shaft 86 as best seen in FIG. 2. Accordingly, when the staking head is in the staking position, axial movement of shaft 86 inwardly against the bias of spring 90 causes steel ball 96 to pivot the levers 68 on pivot ring 72 causing shoes 74 to move generally radially outwardly engaging the inner wall 26 of end cap 12 and crimping it to the magazine 14 to form a light-tight seal. Axial movement of shaft 86 may be accomplished by power means such as an air cylinder having its piston rod coupled to the shaft 86 by any suitable means.

To prevent interference between shoes 74 and the lowermost end cap 12 in chute 18 when the staking head is returned to its normal position, a finger 98 of arcuate cross section is secured to the inner periphery of nose 46 and movable therewith for blocking the end cap feed chute when the aligned end cap is slidably moved along opening 30 onto a magazine.

Figure 6:
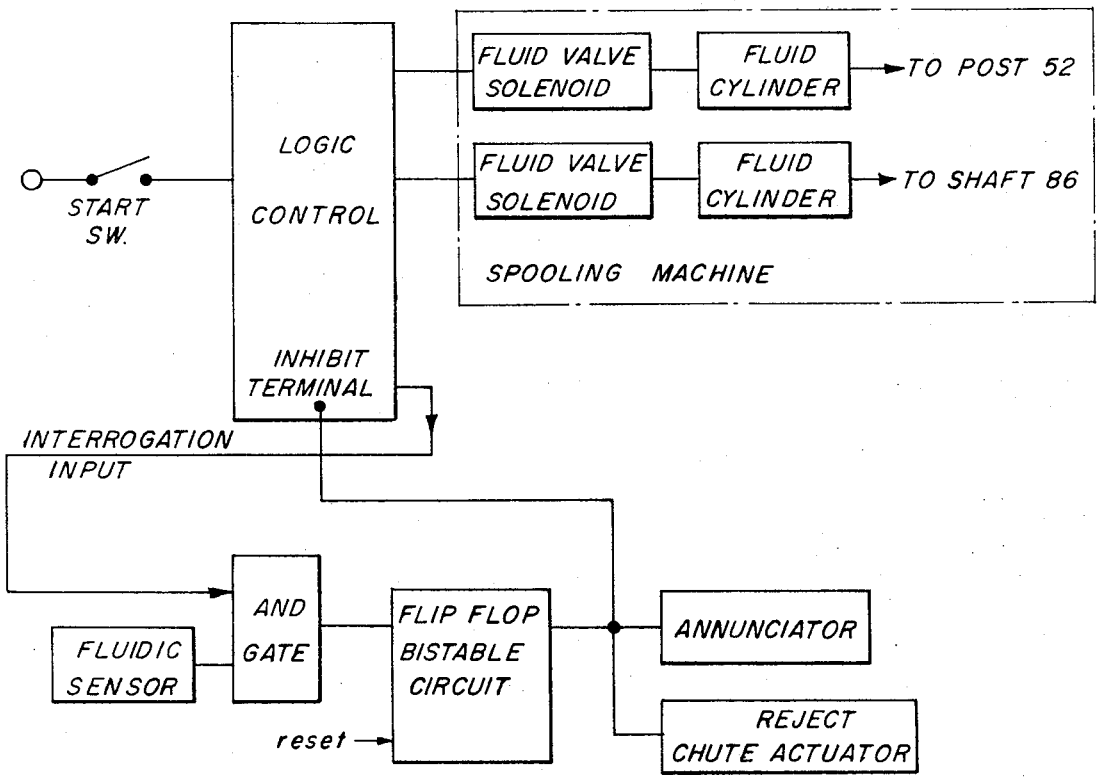
FIG. 6 is a diagrammatic view of a control system for the misaligned end cap detecting mechanism.

The detecting mechanism of this invention for detecting an improperly capped magazine 14 comprises a fluid passageway or groove 100 of substantially T-shaped cross section (FIG. 2) provided along the inner periphery of housing opening 66. The groove has a thin neck extending to the periphery of opening 66 and arranged in alignment with and closed off by retainer 78 in its normal position. The fit or clearance between the outer periphery of retainer 78 and opening 66 is designed to permit slidable movement of the retainer within the opening with minimum leakage of fluid such as air from groove 100. The groove has an enlarged base or manifold of large volume with respect to its neck to assist in minimizing or reducing the criticalness of any fluid leakage past the retainer. The housing nose 46 and bushing plate 34 are provided with a fluid port 102 as best seen in FIG. 3 through which fluid in groove 100 is subjected to a positive or negative pressure. When a fluid such as oil is used, positive pressure is applied by any suitable means to port 102. However, if a fluid such as air is used, either positive or negative pressure may be applied to port 102. The housing and bushing are further provided with a fluid port 104 substantially diametrically opposed from port 102 which is connected by tubing or the like to any suitable fluidic pressure measuring device such as a sensor 106. The fluidic sensor, as best seen in FIG. 6, is coupled to a gate, and if no increase or decrease in pressure for a normal pressure is sensed, the flip-flop bistable circuit remains in its normal position in which cyclical machine operation continues. However, if a change in pressure is sensed due to movement of retainer 78 out of blocking engagement with groove 100 caused by interference between magazine 14 and end cap 12 above a predetermined value set by spring 76, this condition in combination with an interrogation input pulse from a logic control causes the bistable circuit to assume a new position in which operation of the spooling machine including the capping device is stopped at the end of a cycle, a reject chute is actuated, operation of the fluid cylinder and expander shaft of the staking mechanism is inhibited, and an annunciator is actuated to alert the operator.

In the operation of this invention, the staking mechanism is initially in its normal position as seen in FIG. 2 in which expander shaft 86 is in its retracted position, staking levers 68 in their retracted position, and face plate 16 and bushing plate 34 in their maximum separated position. Let us assume that an end cap 12 has been gravity fed along chute 18 into the face plate opening 30 where it is releasably held by magnets 32, and a magazine 14 is placed in alignment therewith. Upon a signal from the logic system a solenoid operated fluid valve of a conventional type is energized for porting fluid such as oil or air to a cylinder causing posts 52 to move housing 48. During such movement, the face plate 16, bushing plate 34, housing 48, and expander shaft 86 all move together as a unit until the face plate engages stop 62. At such time, the end of magazine 14 extends approximately 0.090 of an inch into face plate opening 30. Continued movement of housing 48 causes shoes 74 of levers 68 to engage end cap 12, and to slide it along face plate opening 30 and onto the end of magazine 14. The flange 50 of housing 48 engages stop 64 designed to prevent any further movement of bushing plate 34 and housing 48 after the end cap 12 is properly seated on magazine 14. If the seating is proper, a solenoid operated fluid valve (FIG. 6) is energized by the logic system for porting fluid under pressure to a fluid cylinder for axially moving expander shaft 86. Axial movement of the expander shaft causes steel ball 96 to engage ramps 94 and force staking shoes 74 generally radially outwardly. The shoes stake end cap 12 onto magazine 14 by engaging the inner cap wall 26 and pressing or crimping the inner and outer cap walls 26, 28 respectively together with the magazine end interposed therebetween. In this operation, the circular plate wall forming opening 30 serves as an anvil for supporting the outer cap wall 28. Now, if during such a staking operation, interference should occur between the magazine 14 and end cap 12 of a predetermined value in excess of spring 76 for any reason such as a misaligned magazine, or a bent magazine end or end cap, such interference will prevent further advance of staking levers 68. Continued movement of bushing plate 34 and housing 48 as a unit relative to levers 68 and retainer 78 compresses spring 76 and causes the neck of groove 100 to be uncovered. This results in a change in fluid pressure which is sensed by fluidic sensor 106, and in combination with an interrogation pulse from the binary counter of the logic system actuates the flip-flop bistable circuit. Actuation of the bistable circuit causes the spooling machine including the capping device to stop after completion of the cycle of operation, the staking mechanism to be inhibited, any suitable diverting mechanism (not shown) to be actuated for diverting the improperly sealed magazine into a reject bin, and an annunciator actuated to alert the operator.

The invention has been described in detail with particular reference to a preferred embodiment thereof, but it will be understood that variations and modifications can be effected within the spirit and scope of the invention as described hereinabove.

We claim:

1. In a staking mechanism for staking an end cap onto a magazine, the combination comprising:
   means for holding an end cap and magazine in alignment with one another;
   means for moving the end cap onto the magazine;
   staking means movable with said moving means and operated in timed relation thereto when enabled for staking the mounted end cap to the magazine; said staking means being mounted for limited movement relative to said cap moving means;
   detecting means responsive to relative movement between said moving means and said staking means for detecting interference between the end cap and magazine prior to the staking of the end cap onto the magazine; and disabling means responsive to said detecting means for disabling said staking means when interference is detected.

2. The invention according to claim 1 wherein said detecting means comprises a fluidic sensor.

3. The invention according to claim 1 wherein said detecting means comprises a fluid passageway formed by said moving means and said staking means, said passageway being in a relatively fluid-tight condition when said moving and staking means are in a normal position, and in a fluid-leaking condition when relative movement occurs between said moving and staking means due to interference between the end cap and magazine.

4. The invention according to claim 3 wherein said moving means comprises a housing having an opening of a predetermined configuration, and said staking means comprises a member of a corresponding configuration slidably mounted within said opening, and said fluid passageway comprises a peripheral groove along the periphery of said opening which cooperates with said member for movement between said fluid-tight and fluid-leaking conditions.

5. The invention according to claim 1 wherein said moving means comprises a movable housing having an axial opening of a predetermined configuration; said staking means comprises staking fingers mounted within said opening for axial movement relative to said housing, an annular ring complementary to and slidably mounted within said opening and abutting said staking fingers, and a spring biasing said ring against said staking fingers; and said detecting means comprises a peripheral groove formed along the periphery of said opening in alignment with and having its open position blocked off by said ring to enclose said groove, a fluid inlet fluidly connected to said groove for subjecting fluid in said groove to a predetermined pressure, a fluid outlet fluidly connected to said groove, and a fluidic sensor fluidly connected to said fluid outlet for sensing the fluid pressure in said groove and adapted to actuate said disabling means when said pressure is changed from said predetermined value caused by movement of said ring out of blocking engagement with said groove upon interference between the end cap and magazine.

6. The invention according to claim 5 wherein said groove is of a substantially T-shaped cross section.

7. The invention according to claim 6 wherein said groove is circular and comprises a manifold portion of a predetermined volume and a neck portion of a smaller volume fluidly connecting said manifold to the periphery of said opening.

* * * * *